United States Patent [19]
Uehara

[11] Patent Number: 5,873,442
[45] Date of Patent: Feb. 23, 1999

[54] FRICTION CLUTCH

[75] Inventor: Hiroshi Uehara, Osaka, Japan

[73] Assignee: Exedy Corporation, Neyagawa, Japan

[21] Appl. No.: 857,691

[22] Filed: May 16, 1997

[30] Foreign Application Priority Data

May 23, 1996 [JP] Japan ................................. 8-151515

[51] Int. Cl.⁶ .................................................. F16D 13/75
[52] U.S. Cl. ................................... 192/70.25; 192/89.23; 192/111 A
[58] Field of Search ........................... 192/70.25, 111 A, 192/89.23, 70.18

[56] References Cited

U.S. PATENT DOCUMENTS

| 5,409,091 | 4/1995 | Reik et al. | 192/70.25 |
| 5,450,934 | 9/1995 | Maucher | 192/70.25 |
| 5,641,048 | 6/1997 | Von Gaisberg | 192/70.25 |
| 5,727,666 | 3/1998 | Maucher | 192/70.25 |

OTHER PUBLICATIONS

D.A. Davies, BSc; Paper 1. Friction Clutches and Clutch Control Mechanisms; Proc Instn Mech Engrs 1969–70; pp. 1–38; vol. 184 Pt 31.

*Primary Examiner*—Rodney H. Bonck
*Attorney, Agent, or Firm*—Marshall & Melhorn

[57] ABSTRACT

In a friction clutch including a diaphragm spring for urging a pressure plate into pressing a clutch disk against a flywheel, a support ring member for supporting the diaphragm spring from the back with respect to the clutch cover is normally urged toward the pressure plate, but restrained by a resilient spacer member which is provided on the pressure plate. The resilient spacer member normally restrains the support ring member against the urging force but, once the clutch disk is worn and the pressure plate is thereby caused to move closer to the flywheel, allows the support ring member to move toward the pressure plate by a distance corresponding to the wear in the clutch disk. The back support point of the diaphragm spring is thus moved toward the flywheel according to the amount of wear which develops in the facing members of the clutch disk, and this adjusting action can be achieved with a simple arrangement and in an stable and immediate manner.

6 Claims, 7 Drawing Sheets

FRICTION CLUTCH

TECHNICAL FIELD

The present invention relates to a friction clutch comprising a diaphragm spring for frictionally engaging a clutch disk with a pressure plate.

BACKGROUND OF THE INVENTION

In a friction clutch, for instance for automotive use, a pressure plate for frictionally engaging a clutch disk including clutch facing members is resiliently supported by a clutch cover so as to be urged away from the clutch facing, and the pressure plate is resiliently urged toward the clutch facing by a diaphragm spring when the clutch is engaged. In such a friction clutch, the pressure plate is normally pressed against the clutch facing by the spring force of the diaphragm spring, and the clutch may be disengaged by displacing the diaphragm spring so as to remove the spring force applied to the pressure plate and thereby move the pressure plate away from the clutch facing.

The clutch is disengaged by engaging a central part of the diaphragm spring with a release bearing which is axially actuated by a clutch pedal, and axially moving the central part of the diaphragm spring with the operation of the clutch pedal. The diaphragm spring is deflected away from a back support point defined circumferentially on a back side of the diaphragm spring in a radially middle point thereof as a result, and this releases the pressure applied to the pressure plate.

As the wear of the clutch facing progresses, the position of the pressure plate for engaging the clutch facing shifts toward the flywheel so that the point of force application by the diaphragm spring to the pressure plate also shifts toward the flywheel. As a result, the amount of deflection of the diaphragm spring when engaging the clutch changes with the progress in the wear of the clutch facing, and the orientation of the diaphragm spring changes from its initial state so that the point of force application by the release bearing to the diaphragm spring also changes.

The diaphragm spring is normally provided with a negative spring constant property in the region where the clutch is released so that the pedal force required for disengaging the clutch may be minimized. For technical details of the diaphragm spring having a negative spring constant property, reference should be made to "Paper 1. Friction Clutches and Clutch Control Mechanisms" D. A. Davies, Proc Instn Mech Engrs, 1969–70, Vol 184 Pt 31. The contents of this publication is hereby incorporated in this application by reference. In terms of clutch release force, the change in the point of force application by the release bearing to the diaphragm spring and the configuration of the diaphragm due to the wear of the clutch facing changes the operating point of the diaphragm spring, and this may result in an unacceptable increase in the pedal force required to disengage the clutch.

BRIEF SUMMARY OF THE INVENTION

In view of such problems of the prior art, a primary object of the present invention is to provide a friction clutch comprising a diaphragm spring for selectively engaging a clutch disk which can maintain the operating point of the diaphragm spring substantially fixed without regard to the progress of the wear of the clutch facing.

A second object of the present invention is to provide a friction clutch comprising a diaphragm spring which can maintain the position of the inner periphery of the diaphragm spring substantially fixed without regard to the progress of the wear of the clutch facing so that the pedal stroke may be prevented from changing during use.

A third object of the present invention is to provide a friction clutch comprising a diaphragm spring which is simple in structure and economical to manufacture.

According to the present invention, these and other objects can be accomplished by providing a friction clutch, comprising: a diaphragm spring consisting of an annular dish spring which resiliently urges a pressure plate into pressing a clutch disk onto a flywheel in an engaged state of the clutch, the pressure plate being connected to a clutch cover by a return spring and resiliently urged away from the clutch disk by the return spring; a support ring member for supporting a radially intermediate point of the diaphragm spring from a side facing away from the pressure plate; support means for supporting the support ring member with respect to the clutch cover, the support means normally urging the support ring member toward the pressure plate with a biasing spring force and being irreversible against an axial force tending the support ring member away from the pressure plate; and a resilient spacer member interposed between the pressure plate and the support means so as to accommodate a normal axial movement of the pressure plate with respect to the clutch cover but retain the support ring member against the biasing spring force; wherein the resilient spacer member has a spring property which normally restrains the support ring member against the biasing spring force of the support means but, once the clutch disk is worn and the pressure plate is thereby caused to move closer to the flywheel, allows the support means to move the support ring member toward the pressure plate by a distance corresponding to the wear in the clutch disk.

Thus, when a wear develops in the clutch facing, it increases the displacement of the pressure plate toward the flywheel, and this in turn reduces the spring force of the resilient spacer member which has been restraining the support means from raising the support ring member. Typically, the resilient spacer member is held on the pressure plate in a prestressed state. As a result, the resilient spacer member allows the displacement of the support ring member by a distance corresponding to the wear of the clutch disk, in particular the clutch facing members of the clutch disk.

According to a preferred embodiment of the present invention, the resilient spacer member comprises a sheet spring having a first end abutting an axial end surface of the pressure plate, a second end engaged in a notch formed in the pressure plate, and an intermediate portion abutting an opposing side of the support means. The resilient spacer member may consist of an annular sheet spring having a suitable curvature or a plurality of sheet spring pieces arranged on a common circuit as it is provided with the necessary spring property.

In view of ease of assembly and maintenance, the pressure plate may be provided with an axial projection extending from a side of the pressure plate facing away from the clutch disk and passed through openings formed in the diaphragm spring and the clutch cover to form the notch in the axial projection, and the notch may be formed in the axial projection. Also, the return spring for resiliently urging the pressure plate away from the clutch disk may comprise a cone spring which is coaxially disposed with the clutch cover and has an outer peripheral part engaged by the axial projection and an inner peripheral part engaged by the clutch cover.

The support means may for instance comprise a plurality of circumferential slopes defined coaxially in an inner end surface of the clutch cover, a slider ring member having associated slopes which slidably guided on the slopes, and biasing means urging the slider ring circumferentially upward along the slopes.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
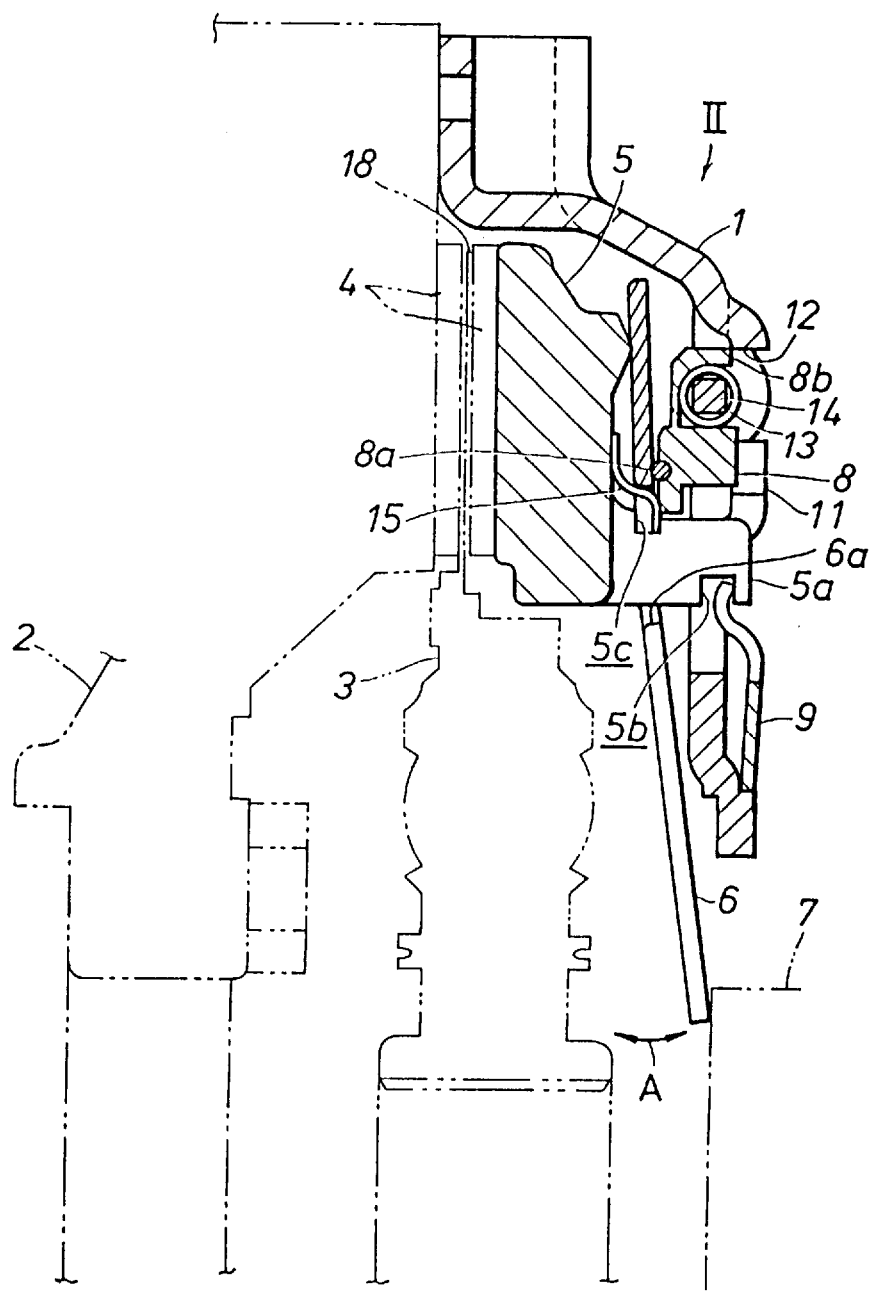
FIG. 1 is a sectional side view of an essential part of the friction clutch according to the present invention.

FIG. 1 is a sectional side view of an essential part of a friction clutch according to the present invention. As shown in the drawing, a clutch cover 1 is securely attached to an input end of the flywheel 2 typically by threaded bolts, and a space defined between them accommodates a clutch disk 3 including a pair of planar and annular clutch facing members 4 attached to either side thereof, an annular pressure plate 5 for pressing the clutch disk 3 against the flywheel 2, and a diaphragm spring 6 for resiliently biasing the pressure plate 5, all in a coaxial arrangement.

The diaphragm spring 6 includes a plurality of comb-shaped tongue pieces formed by cutting out a plurality of radial slots from an inner periphery of the dish spring at an equal angular interval. The diaphragm spring 6 is adapted to tilt or deflect as indicated by arrow A in the drawing as a release bearing 7 actuates an inner periphery of the diaphragm spring 6 in either direction to engage and disengage the clutch as indicated by arrow A. FIG. 1 shows the engaged state of the clutch in which the diaphragm spring 6 presses the pressure plate 5 toward the flywheel 2.

An inner peripheral part of the pressure plate 5 is integrally provided with a number of projections 5a standing upright toward the clutch cover 1, and each of these projections 5a is provided with a side recess 5b facing an axial center of the clutch. An annular cone spring 9 is coaxially secured to the clutch cover 1 at an inner periphery thereof, and an outer periphery of this cone spring 9 is engaged by the side recesses 9b of the clutch cover projections 5a. This cone spring 9 resiliently urges the pressure plate 5 away from the clutch disk 3. A support ring member 8a consisting of a ring of steel wire is interposed between the slider ring 8 and the diaphragm spring 6.

As the release bearing 7 is actuated axially leftward as seen in FIG. 1, for instance by pressing a clutch pedal by a certain stroke, and the diaphragm spring 6 is deflected in such a manner that the pressure applied by the peripheral part of the diaphragm spring 6 to the pressure plate 5 is removed, and the clutch disk 3 is disengaged from the flywheel 2. Thus, the clutch is disengaged.

Figure 2:
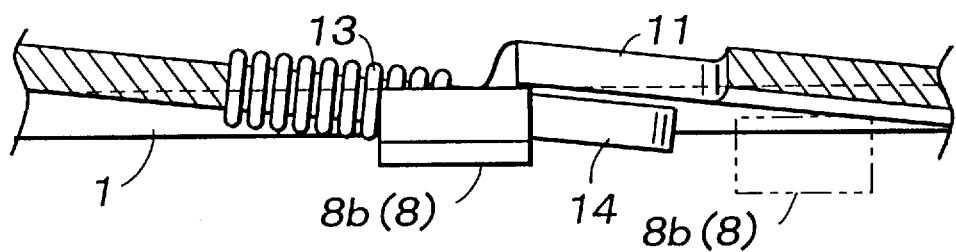
FIG. 2 is an enlarged sectional view of an essential part of the friction clutch as seen from arrow II of FIG. 1.

The end plate of the clutch cover 1 extending perpendicularly to the axial line of the clutch is provided with a plurality of slopes 11 defined by raising the material of the end plate at a regular angular interval. The slopes 11 are defined such that the slider ring 8 moves toward the clutch disk 3 as it slides circumferentially on these slopes 11 as best illustrated in FIG. 2. The slider ring 8 is integrally formed with three arms 8b extending radially from three locations along the outer periphery of the slider ring 8. The clutch cover 1 is provided with openings 12 for receiving these arms 8b. A compression coil spring 13 is interposed between each of the arms 8b and an edge of the corresponding one of the openings 12 of the clutch cover 1, and is guided by a curved rod 14 extending circumferentially from the associated edge of the opening 12 and passed into the compression coil spring 13. The compression coil springs 13 urge the slider ring 8 circumferentially upward along the slopes 11. However, the angle of the slopes 11 is selected in relation with the effective frictional coefficient such that the slider ring 8 is irreversible or, in other words, would not move downward along the slopes 11 even when an axial force is applied to the slider ring 8.

The radially outer side of each of the projections 5a is provided with a notch 5c for engaging an end of a resilient spacer 15 consisting of a S-shaped sheet spring member. The other end of the resilient spacer 15 is placed flat on an axial end of the pressure plate 5. The resilient spacer 15 is thus placed under a pre-stressed condition. An intermediate part of the resilient spacer 15 adjacent to the end engaged by the engagement notch 5c and extending laterally with respect to the axial line of the clutch abuts an axial end surface of the slider ring 8. Therefore, the resilient spacer 15 resiliently restricts the movement of the slider ring 8 in the axial direction toward the clutch disk 3.

The clutch disk 3 is formed by interposing a steel disk with a pair of facing members 4 as mentioned earlier, and a wave spring 18 is interposed between the two facing members 4 so that the handling of the clutch at the time of partially engaging the clutch may be improved.

The mode of operation of this clutch is now described in the following. FIG. 1 shows the state of the clutch when the clutch disk 3 is new. A radially intermediate part of the diaphragm spring 6 is engaged by the support ring member 8a of the slider ring 8. In this state, the diaphragm spring 6 is somewhat resiliently deformed with the support ring member 8a providing a back support point for the diaphragm spring 6, and the resilient restoring force of the diaphragm spring 6 urges the pressure plate 5 into pressing the clutch disk 3 against the flywheel 2.

Figure 3:
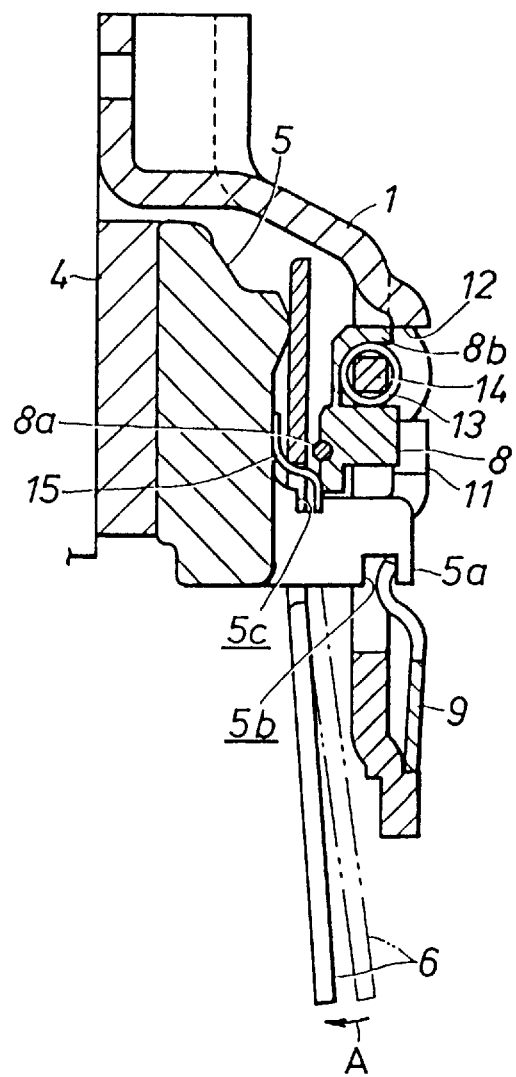
FIG. 3 is a view similar to FIG. 1 showing the clutch at an intermediate state of clutch disengagement when the facing is not worn.

Referring to FIG. 3, when the release bearing 7 is actuated in the axial direction as indicated by arrow A by pressing down a clutch pedal, the diaphragm spring 6 is deflected away from the support ring member 8a, or from the position indicated by the imaginary lines to the position indicated by the solid lines.

The diaphragm spring 6 is provided with a negative spring property region in which the spring force of the diaphragm spring 6 progressively diminishes with an increase in the displacement of an inner peripheral part of the diaphragm spring 6 or a clutch release stroke. Therefore, according to this embodiment, as the diaphragm spring 6 deflects as indicated by the solid lines in FIG. 3, the spring force of the cone spring 9 eventually exceeds the biasing force of the diaphragm spring 6 with the result that the pressure plate 5 is raised away from the clutch disk 3 by the spring force of the cone spring 9 as shown in FIG. 4.

Figure 4:
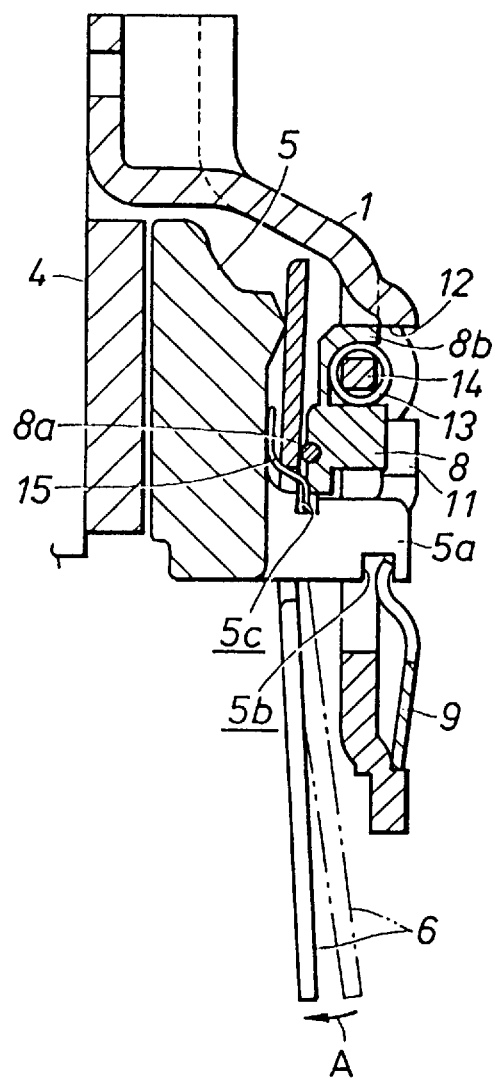
FIG. 4 is a view similar to FIG. 1 showing the disengaged state of the clutch when the facing is not worn.

FIG. 4 shows the disengaged state of the clutch in which the pressure plate 5 is displaced toward the slider ring 8. The closing of the gap between the slider ring 8 and the pressure plate 5 causes a resilient deformation of the resilient spacer 15, but this occurs within the elastic range of the material of the resilient spacer and does not affect the remaining part of the clutch. When the release bearing 7 is returned to its original position, the clutch returns to the engaged state shown in FIG. 1 after going through the state shown in FIG. 3.

Figure 5:
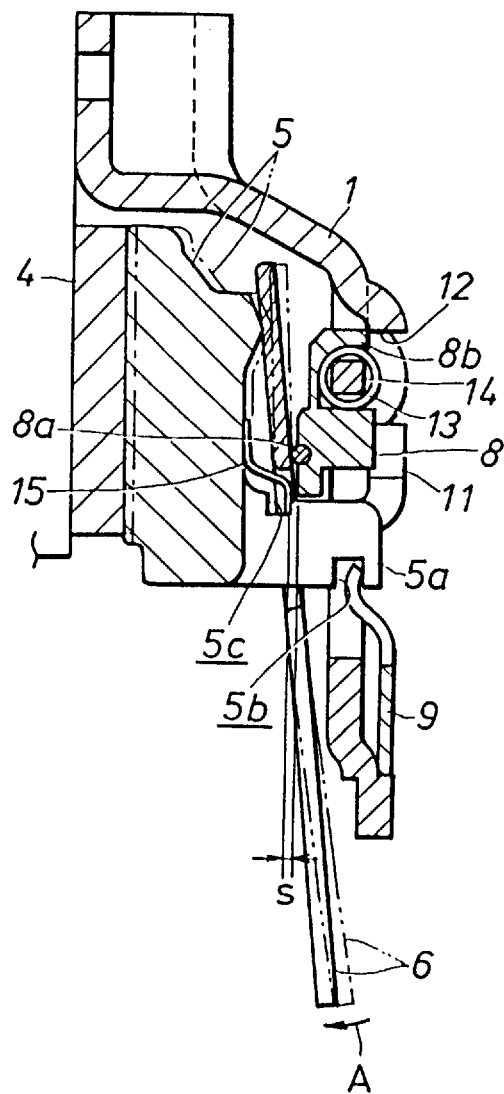
FIG. 5 is a view similar to FIG. 3 when the facing is worn.

When the wear of the facing members 4 of the clutch disk 3 has progressed to a certain extent, the pressure plate 5 shifts toward the flywheel by a distance corresponding to the amount of wear as indicated by the change from the imaginary lines to the solid lines in FIG. 5. As a result, the projections 5a which are integral with the pressure plate 5 also move more toward the flywheel 2 so that a gap S is produced between the slider ring 8 and the intermediate part of the resilient spacer 15 which was in contact with the slider ring 8 in the unworn state of the clutch disk 3. This also causes an increase in the deflection of the cone spring 9 which urges the pressure plate 5 away from the flywheel 2, the engaged state of the clutch is maintained by appropriately setting the initial spring load of the diaphragm spring 6.

Figure 6:
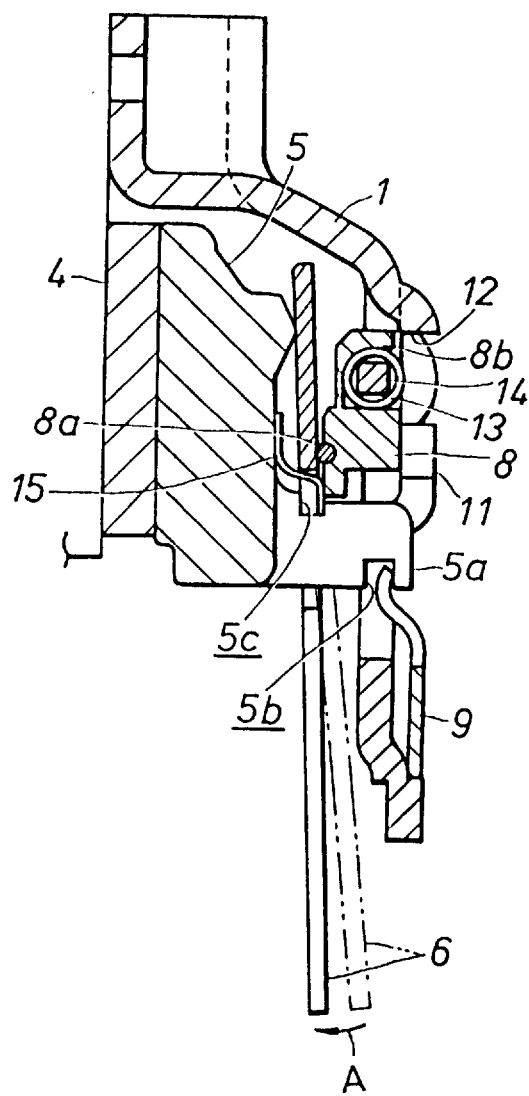
FIG. 6 is a view similar to FIG. 3 after the wear compensating action has taken place.

When the clutch is disengaged in this worn state, the diaphragm spring 6 deflects from the position indicated by the imaginary lines to that indicated by the solid lines in FIG. 6 so that a gap is created also between the support ring member 8a and the diaphragm spring 6. However, because there is the gap S between the spacer 15 and the slider ring 8 as mentioned earlier, and the frictional resistance to the slider ring 8 owing to the pressure applied thereto by the diaphragm spring 6 and the spacer 15 is thereby removed, the slider ring 8 is allowed to move circumferentially under the spring force of the compression coil springs 13 until the slider ring 8 is engaged by the spacer 15 as shown in FIG. 6.

FIG. 6 shows the engaged state of the clutch in which the spacer 15 is fully extended or at its initially installed state. Thus, the slider ring 8 has displaced by a distance corresponding to the amount of the wear of the facing members 4 of the clutch disk 3 so as to adjust the support point by the corresponding distance. Once this adjustment is made, the slider ring 8 is held at the new position by the spacer 15 so that the relative positions between the pressure plate 5, the diaphragm spring 6 and the slider ring 8 remain the same as the original positions.

Figure 7:
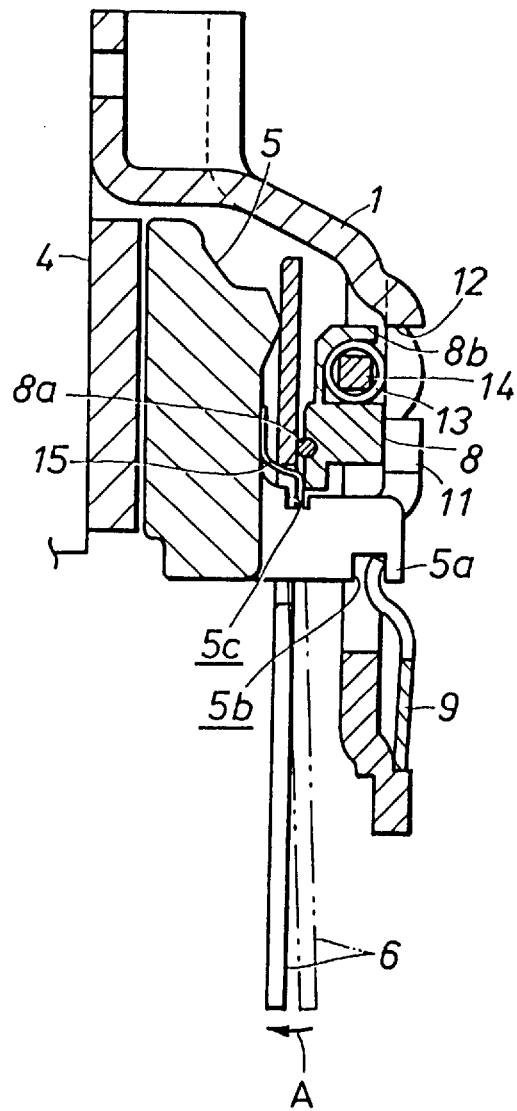
FIG. 7 is a view similar to FIG. 4 when the facing is worn.

When the orientation of the diaphragm spring 6 at its deflected state changes from that shown in FIG. 6 or the position indicated by the imaginary lines in FIG. 7 to the position indicated by the solid lines in FIG. 7, the restoring force of the cone spring 9 becomes greater than that of the diaphragm spring 6, and the pressure plate 5 is pulled away from the clutch disk 3 as shown in FIG. 7.

This wear compensating action automatically takes place as soon as any wear develops in the facing members 4 of the clutch disk 3, and the relatively position between the pressure plate 5 and the slider ring 8 is kept fixed at all times. In reality, the wear develops very gradually, and the amount of wear compensation which takes place in each cycle of clutch engagement and disengagement is accordingly very small. However, the wear compensation action is immediate, and the relative position between the pressure plate and the clutch disk is in effect constant without regard to the progress of the wear of the facing members of the clutch disk. The slider ring 8 and the support ring member 8a may consist of either metal or synthetic resin as long as they can withstand the release load.

Thus, according to the present invention, the support point of the diaphragm spring is moved toward the flywheel according to the amount of wear which develops in the facing members of the clutch disk, and this adjusting action is accomplished by cooperation between a slider ring which urges the support point toward the flywheel and a resilient spacer which permits the movement of the back support point by a distance corresponding to the amount of the wear. Thus, the wear compensation action is achieved with a simple arrangement and in an stable and immediate manner.

Although the present invention has been described in terms of a preferred embodiment thereof, it is obvious to a person skilled in the art that various alterations and modifications are possible without departing from the scope of the present invention which is set forth in the appended claims.

What we claim is:

1. A friction clutch, comprising:
   a diaphragm spring consisting of an annular dish spring which resiliently urges a pressure plate into pressing a clutch disk onto a flywheel in an engaged state of the clutch, said pressure plate being connected to a clutch cover by a return spring and resiliently urged away from said clutch disk by said return spring;
   a support ring member for supporting a radially intermediate point of said diaphragm spring from a side facing away from said pressure plate;
   support means for supporting said support ring member with respect to said clutch cover, said support means normally urging said support ring member toward said pressure plate with a biasing spring force and being irreversible against an axial force tending said support ring member away from said pressure plate; and
   a resilient spacer member interposed between and engaging said pressure plate and said support means so as to accommodate a normal axial movement of said pressure plate with respect to said clutch cover but retain said support ring member against said biasing spring force;
   wherein said resilient spacer member has a spring property which normally restrains said support ring member against said biasing spring force of said support means but, once said clutch disk is worn and said pressure plate is thereby caused to move closer to said flywheel, allows said support means to move said support ring member toward said pressure plate by a distance corresponding to said wear in said clutch disk.

2. A friction clutch according to claim 1, wherein said resilient spacer member is held by said pressure plate in a pre-stressed state.

3. A friction clutch according to claim 1, wherein said resilient spacer member comprises a sheet spring having a first end abutting an axial end surface of said pressure plate, a second end engaged in a notch formed in said pressure plate, and an intermediate portion abutting an opposing side of said support means.

4. A friction clutch according to claim 3, wherein said pressure plate is provided with an axial projection extending from a side of said pressure plate facing away from said clutch disk and passed through openings formed in said diaphragm spring and said clutch cover, and said notch is formed in said axial projection.

5. A friction clutch according to claim 4, wherein said return spring for resiliently urging said pressure plate away from said clutch disk comprises a cone spring which is coaxially disposed with said clutch cover and has an outer peripheral part engaged by said projection and an inner peripheral part engaged by said clutch cover.

6. A friction clutch according to claim 1, wherein said support means comprises a plurality of circumferential slopes defined coaxially in an inner end surface of said clutch cover, a slider ring member having associated slopes which slidably guided on said slopes, and biasing means urging said slider ring circumferentially upward along said slopes.

* * * * *